United States Patent [19]
Gill

[11] Patent Number: 5,828,529
[45] Date of Patent: Oct. 27, 1998

[54] ANTIPARALLEL PINNED SPIN VALVE WITH READ SIGNAL SYMMETRY

[75] Inventor: Hardayal Singh Gill, Portola Valley, Calif.

[73] Assignee: International Business Machines Corporation, Armonk, N.Y.

[21] Appl. No.: 841,182

[22] Filed: Apr. 29, 1997

[51] Int. Cl.$^6$ ....................................... G11B 5/30
[52] U.S. Cl. ................................................ 360/113
[58] Field of Search ............................................. 360/113

[56] References Cited

U.S. PATENT DOCUMENTS

| | | | |
|---|---|---|---|
| 5,465,185 | 11/1995 | Heim et al. | 360/113 |
| 5,666,248 | 9/1997 | Gill | 360/113 |
| 5,688,605 | 11/1997 | Iwasaki | 360/113 |

Primary Examiner—A. J. Heinz
Attorney, Agent, or Firm—Gray Cary Ware Freidenrich

[57] ABSTRACT

A thin film magnetoresistive (MR) spin valve read sensor is provided which has positive and negative read signal symmetry about a zero bias point of a transfer curve upon sensing positive and negative magnetic incursions of equal magnitude from a moving magnetic medium, the sensor including a ferromagnetic free layer which has a magnetic moment which is free to rotate in first and second directions from a position which corresponds to the zero bias point upon sensing the positive and negative magnetic incursions respectively, an antiparallel pinned layer, an antiferromagnetic layer immediately adjacent the antiparallel pinned layer which pins the magnetic moment of the antiparallel pinned layer along a pinned direction, an electrically conductive nonmagnetic spacer layer sandwiched between the free layer and the antiparallel pinned layer so that, upon sensing the positive and negative magnetic incursions, the magnetic moment of the free layer rotates in the first and second directions relative to the pinned direction of the magnetic moment of the pinned layer, thus causing an increase or decrease in magnetoresistance respectively, and a sense current source for applying a sense current through the sensor in a predetermined direction and of a predetermined magnitude so that, in response to the increase and decrease in magnetoresistance, the sensor produces positive and negative read signal symmetry about the zero bias point.

54 Claims, 6 Drawing Sheets

FIG. 8
(ABS)

FIG. 9
(ROTATED 90°)

FIG. 10
(ABS)

FIG. 11
(ROTATED 90°)

FIG. 12
($H_{SC}$)

FIG. 13
($H_{AMR\ EFFECT}$)

FIG. 14
($H_{AMR\ EFFECT} - H_{SC}$)

ANTIPARALLEL PINNED SPIN VALVE WITH READ SIGNAL SYMMETRY

BACKGROUND OF THE INVENTION

1. Field of the Invention

The present invention relates to an antiparallel pinned spin valve read head wherein magnetic and anisotropic magnetoresistive (AMR) influences on the bias point of the transfer function of the read head are balanced so that the read head produces read signal symmetry.

2. Description of the Related Art

A spin valve sensor is employed by a read head for sensing magnetic fields from moving magnetic media, such as a magnetic disk or a magnetic tape. The sensor includes a nonmagnetic conductive layer, hereinafter referred to as a spacer layer, sandwiched between first and second ferromagnetic layers, hereinafter referred to as a pinned layer, and a free layer. First and second leads are connected to the spin valve sensor for conducting a sense current therethrough. The magnetization of the pinned layer is pinned 90° to the magnetization of the free layer and the magnetization of the free layer is free to respond to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons are scattered by the interfaces of the spacer layer with the pinned and free layers. When the magnetizations of the pinned and free layers are parallel with respect to one another, scattering is minimal and when the magnetizations of the pinned and free layers are antiparallel, scattering is maximized. Changes in the scattering changes the resistance of the spin valve sensor in proportion to sin θ, where θ is the angle between the magnetizations of the pinned and free layers. A spin valve sensor has a very high magnetoresistive (MR) coefficient, substantially higher than an anisotropic magnetoresistive (AMR) sensor. For this reason it is sometimes referred to as a giant magnetoresistive (GMR) sensor.

A read head employing a spin valve sensor (hereinafter referred to as a "spin valve read head") may be combined with an inductive write head to form a combined magnetic head. The combined magnetic head may have the structure of either a merged head, or a piggyback head. In a merged head a single layer serves as a shield for the read head and as a first pole piece for the write head. A piggyback head has a separate layer which serves as the first pole piece for the write head. In a magnetic disk drive an air bearing surface (ABS) of a combined magnetic head is supported adjacent a rotating disk to write information on or read information from the disk. Information is written to the rotating disk by magnetic fields which fringe across a gap between the first and second pole pieces of the write head. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

An improved spin valve, which is referred to hereinafter as antiparallel pinned (AP) spin valve, is described in commonly assigned U.S. Pat. No. 5,465,185 to Heim and Parkin which is incorporated by reference herein. The AP spin valve differs from the spin valve described above in that the pinned layer comprises multiple thin films. The pinned layer has a nonmagnetic spacer film which is sandwiched between first and second ferromagnetic thin films. The first thin film is immediately adjacent to the antiferromagnetic layer and is exchange-coupled thereto, with its magnetic moment directed in a first direction. The second thin film is immediately adjacent to the free layer and is exchange-coupled to the first thin film by the minimal thickness (in the order of 25 Å) of the spacer film between the first and second thin films. The magnetic moment of the second thin film is oriented in a second direction that is antiparallel to the direction of the magnetic moment of the first film. The magnetic moments of the first and second films subtractively combine to provide a net pinning moment of the pinned layer. The direction of the net pinning moment is determined by the thicker of the first and second thin films. The thicknesses of the first and second thin films are chosen so that the net pinning moment is small. A small net pinning moment equates to a small demagnetization (demag) field from the pinned layer. Since the antiferromagnetic exchange coupling is inversely proportional to the net pinning moment, this results in a large exchange coupling.

A large exchange coupling promotes higher thermal stability of the head. When the head encounters high heat conditions due to electrostatic discharge from an object, or due to contacting an asperity on the magnetic disk, the blocking temperature of the antiferromagnetic layer can be exceeded, causing it to lose its directed magnetic moment. The magnetic moment of the pinned layer is then no longer pinned in the desired direction. In this regard, significant advantages of the AP pinned spin valve over the typical single film pinned layer are a greater exchange coupling field and a lower demag field, which enhance thermal stability of a spin valve sensor.

In the prior art, free layers have been constructed with thicknesses of 50 Å to optimize the giant magnetoresistive (GMR) coefficient of the spin valve. It would be desirable if this thickness could be increased to about 100 Å for the purpose of enhancing manufacturing yield with only about a 20% sacrifice in the GMR coefficient. A 100 Å thick free layer, however, can increase an AMR effect to almost 1%. Unfortunately, the AMR seriously affects the position of the bias point of the spin valve head relative to positive and negative readback signals detected by the spin valve head, the bias point being a point on a transfer curve of the spin valve head which will be described in more detail hereinafter. The AMR effect is employed in the aforementioned AMR sensor for detecting signals and is due to a change in resistance of an MR stripe in response to magnetic fields from a rotating disk. The free layer in a spin valve demonstrates this same AMR effect which must be dealt with in establishing the bias point.

The transfer curve (readback signal of the spin valve head versus applied signal from the magnetic disk) for a spin valve is linear and is defined by sin θ where θ is the angle between the directions of the magnetic moments of the free and pinned layers. With positive and negative magnetic fields from a moving magnetic disk, which are typically chosen to be equal in magnitude, it is important that positive and negative changes in the GMR of the spin valve read head be equal so that the positive and negative readback signals are equal. When the direction of the magnetic moment of the free layer is parallel to the ABS and the direction of the magnetic moment of the pinned layer is perpendicular to the ABS in a quiescent state (no signal from the magnetic disk) the positive and negative readback signals should be equal when sensing positive and negative fields from the magnetic disk.

The bias point is influenced by four major forces on the free layer, namely a ferromagnetic coupling field $H_{FC}$ between the pinned layer and the free layer, a demag field $H_{demag}$ on the free layer from the pinned layer, a sense current field $H_{SC}$ from all conductive layers of the spin valve except the free layer and the aforementioned influence of the AMR. The influence of the AMR on the bias point is the same as a magnetic influence thereon and can be defined in terms of magnitude and direction and is referred to herein as the AMR EFFECT. Upon investigating the AP pinned spin valve I have found that, when the sense current is conducted in a first direction through the spin valve read head, the direction of the fields $H_{demag}$ and $H_{FC}$ are antiparallel to the direction of the field $H_{SC}$ and the influence of the AMR EFFECT. Since $H_{demag}$ is very low in the AP pinned spin valve, the AMR EFFECT overpowers the antiparallel fields $H_{demag}$ and $H_{FC}$ to displace the bias point, resulting in asymmetry of the readback signals.

SUMMARY OF THE INVENTION

I have discovered that, by reversing the direction of the sense current, I can employ the sense current field $H_{SC}$ to counterbalance influence of the AMR EFFECT on the bias point. When the sense current is reversed from the aforementioned first direction, the direction of the influence of the AMR EFFECT on the free layer is antiparallel to the influence of the fields $H_{SC}$, $H_{demag}$ and $H_{FC}$ on the free layer. The direction and the magnitude of the sense current $I_S$ through the spin valve read head is chosen so that the combined influence of $H_{SC}$, $H_{demag}$ and $H_{FC}$ counterbalances the influence of the AMR EFFECT, thereby positioning the bias point midway (at zero point) between the positive and negative readback signals. I have further discovered that when the sense current is so directed, a sense current field from the free layer on the pinned layer enhances a pinning moment of the pinned layer. I have further discovered that when the sense current is so directed, a unipolar amplifier with a current in the same direction as the sense current can be employed to reset the direction of the magnet moment of the antiferromagnetic layer should the antiferromagnetic layer lose its direction due to high temperature conditions. In this application the unipolar amplifier would conduct a high current, such as three times the sense current, for several nanoseconds to reset the antiferromagnetic layer.

An object of the present invention is to provide an antiparallel pinned spin valve sensor with read signal symmetry.

Another object is to provide an antiparallel pinned spin valve sensor which has a zero bias point in a quiescent state and has improved pinning of the pinned layer.

A further object is to provide an antiparallel pinned spin valve wherein the direction of the magnetic moment of an antiferromagnetic layer for pinning a pinned layer can be reset by a unipolar amplifier upon the occurrence of thermal instability of said magnetic moment.

Still another object is to employ a sense current field for counterbalancing the effect of AMR on the free layer of an antiparallel pinned spin valve sensor so that positive and negative readback signals are symmetrical about a bias point of a transfer curve of the sensor.

Still a further object is to provide an efficient antiparallel pinned spin valve sensor which employs a free layer of increased thickness for increasing manufacturing yield.

Yet another object is to provide a sense current field in an antiparallel pinned spin valve sensor which opposes read signal asymmetry caused by AMR of the sensor.

Other objects and attendant advantages of the invention will be appreciated upon reading the following description taken together with the drawings.

DESCRIPTION OF THE PREFERRED EMBODIMENT

Figure 1:
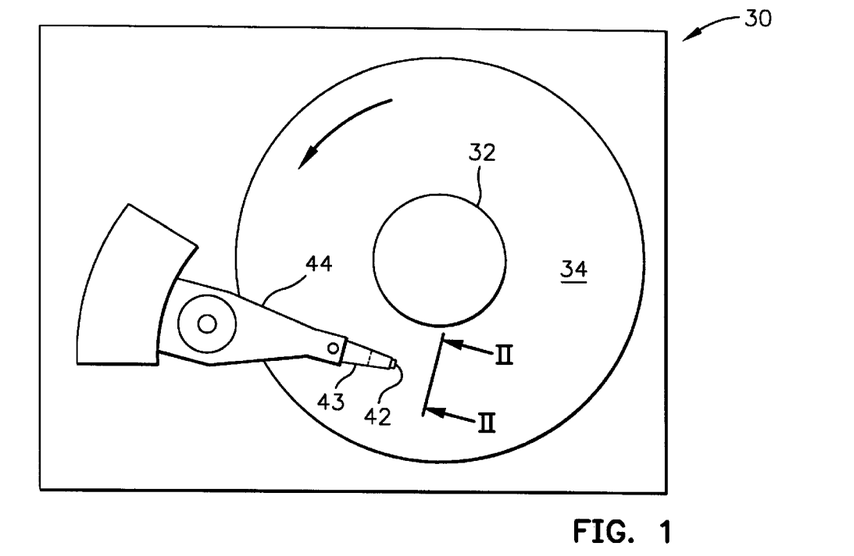
FIG. 1 is a planar view of an exemplary magnetic disk drive.
Figure 2:
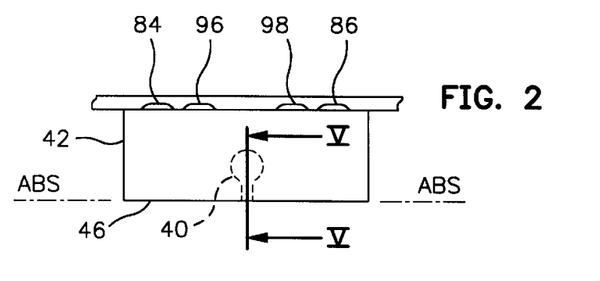
FIG. 2 is an end view of a slider with a magnetic head of the disk drive as seen in plane II—II.
Figure 3:
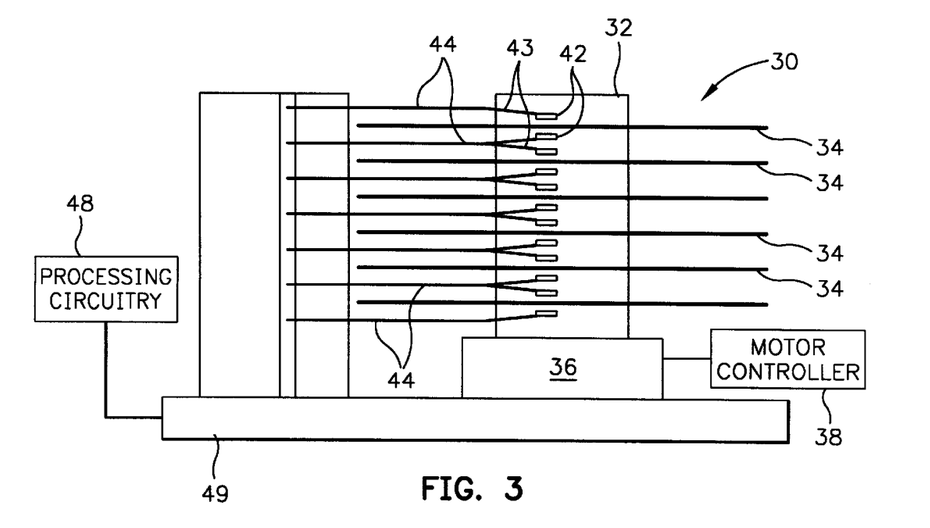
FIG. 3 is an elevation view of the magnetic disk drive wherein multiple disks and magnetic heads are employed.
Figure 4:
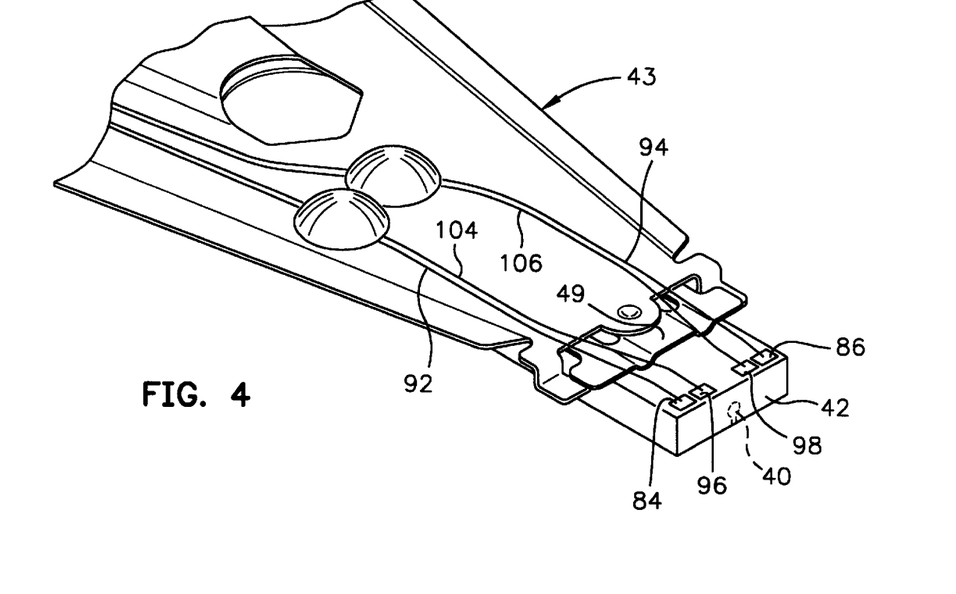
FIG. 4 is an isometric illustration of an exemplary suspension system for supporting the slider and magnetic head.

Referring now to the drawings wherein like reference numerals designate like or similar parts throughout the several views there is illustrated in FIGS. 1–3 a magnetic disk drive 30. The drive 30 includes a spindle 32 which supports and rotates a magnetic disk 34. The spindle 32 is rotated by a motor 36 which in turn is controlled by a motor controller 38. A combined magnetic head 40 for reading and recording is mounted on a slider 42 which, in turn, is supported by a suspension 43 and actuator arm 44. A plurality of disks, sliders and suspensions may be employed in a large capacity direct access storage device (DASD) as shown in FIG. 3. The suspension 43 and actuator arm 44 position the slider 42 to place the magnetic head 40 in a transducing relationship with a surface of the magnetic disk 34. When the disk 34 is rotated by the motor 36 the slider is supported on a thin (typically, 0.05 μm) cushion of air (air bearing) by the air bearing surface (ABS) 46. The magnetic head 40 may then be employed for writing information to multiple circular tracks on the surface of the disk 34, as well as for reading information therefrom. Processing circuitry 48 exchanges signals representing such information with the head 40, provides motor drive signals, and also provides control signals for moving the slider to various tracks. In FIG. 4 the slider 42 is shown mounted to a head gimbal assembly (HGA) 49 which in turn is mounted to the suspension 43. The components described hereinabove may be mounted on a frame 49.

Figure 5:
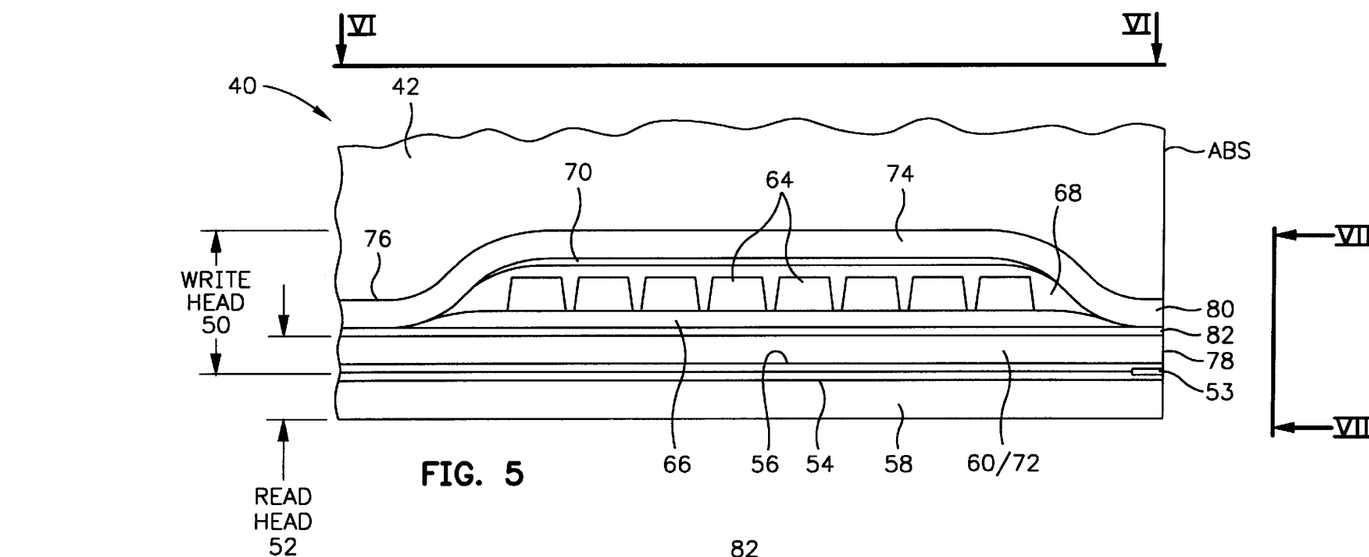
FIG. 5 is a partial view of the slider and magnetic head as seen in plane V—V of FIG. 2.
Figure 7:
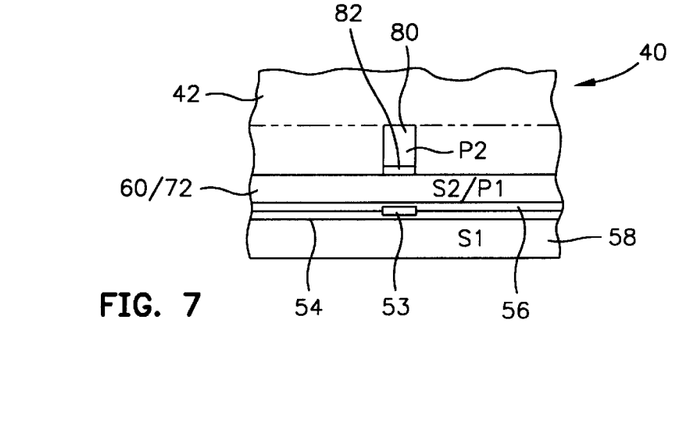
FIG. 7 is a partial ABS view of the slider taken along plane VII—VII to show the read and write elements of the magnetic head.

FIG. 5 is a side cross-sectional elevation view of the magnetic head 40 which has a write head portion 50 and a read head portion 52, the read head portion employing an MR antiparallel (AP) pinned spin valve sensor 53 of the present invention. FIG. 7 is an ABS view of FIG. 5. The MR sensor 53 is sandwiched between first and second gap layers 54 and 56 and the gap layers are sandwiched between first and second shield layers 58 and 60. In response to external magnetic fields, the resistance of the MR sensor 53 changes. A sense current $I_S$ applied to the sensor causes these resistance changes to be manifested as potential changes. These potential changes are then processed by the processing circuitry 48 shown in FIG. 3.

Figure 6:
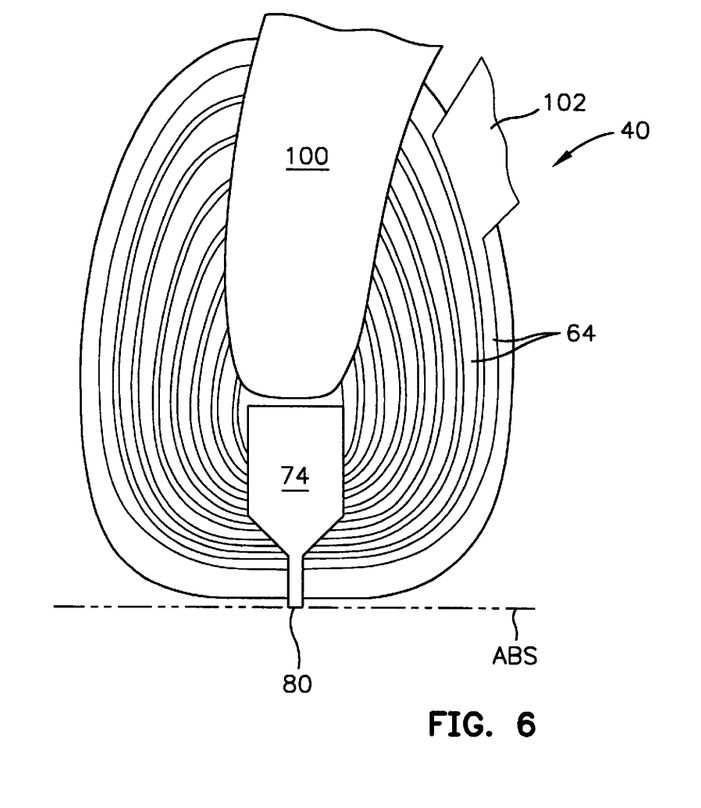
FIG. 6 is a view taken along plane VI—VI of FIG. 5 with all material above the second pole piece removed.

The write head portion of the prior art head includes a coil layer 64 sandwiched between first and second insulation layers 66 and 68. A third insulation layer 70 may be employed for planarizing the head to eliminate ripples in the second insulation layer caused by the coil layer 64. The first, second and third insulation layers are referred to in the art as an "insulation stack". The coil layer 64, and the first, second and third insulation layers 66, 68 and 70 are sandwiched between first and second pole piece layers 72 and 74. The first and second pole piece layers 72 and 74 are magnetically coupled at a back gap 76 and have first and second pole tips 78 and 80 which are separated by a gap layer 82 at the ABS. As shown in FIGS. 2 and 4 first and second solder connections 84 and 86 connect leads 88 and 90 (see FIGS. 8 and 10) from the MR sensor 53 to leads 92 and 94 on the suspension 43 and third and fourth solder connections 96 and 98 connect leads 100 and 102 from the coil 64 (see FIG. 6) to leads 104 and 106 on the suspension.

Figure 8:
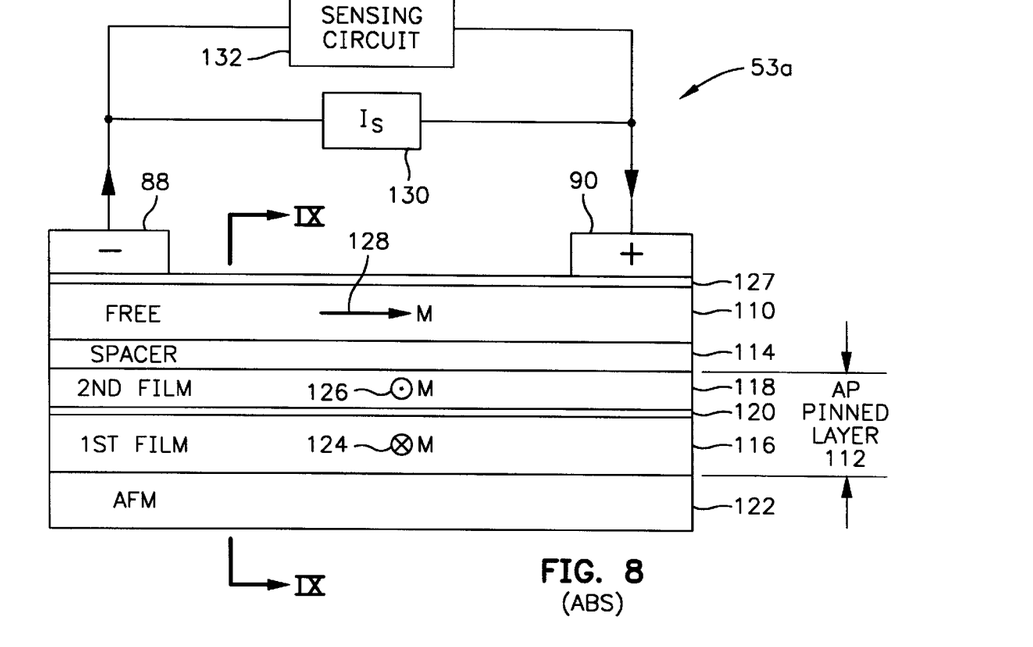
FIG. 8 is an enlarged schematic illustration of the antiparallel pinned spin valve 53 of FIG. 7 with the sense current $I_S$ in a first direction causing asymmetrical readback signals.
Figure 9:
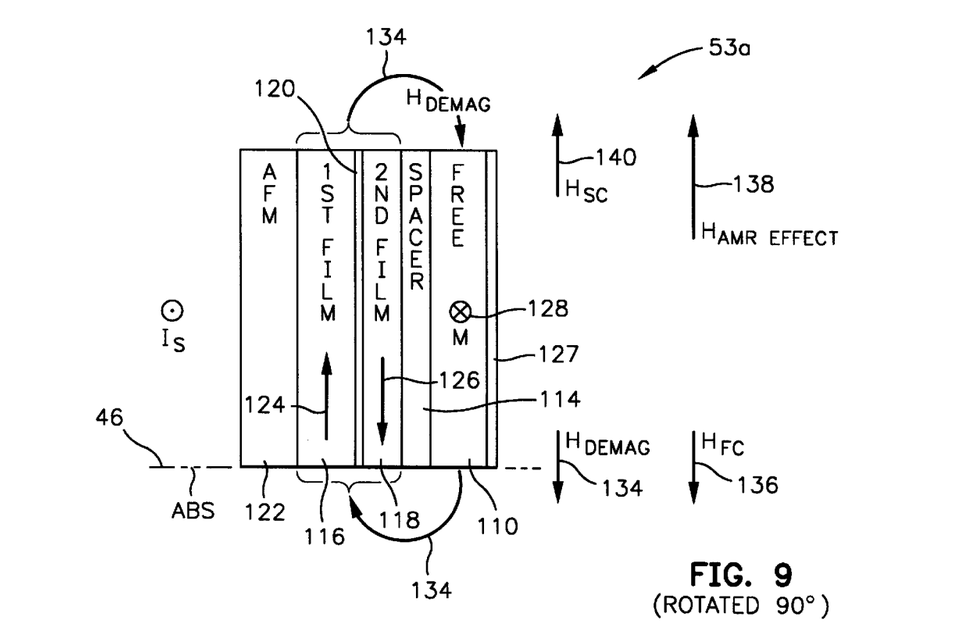
FIG. 9 is a view taken along plane IX—IX of Fig. rotated 90 degrees clockwise.
Figure 10:
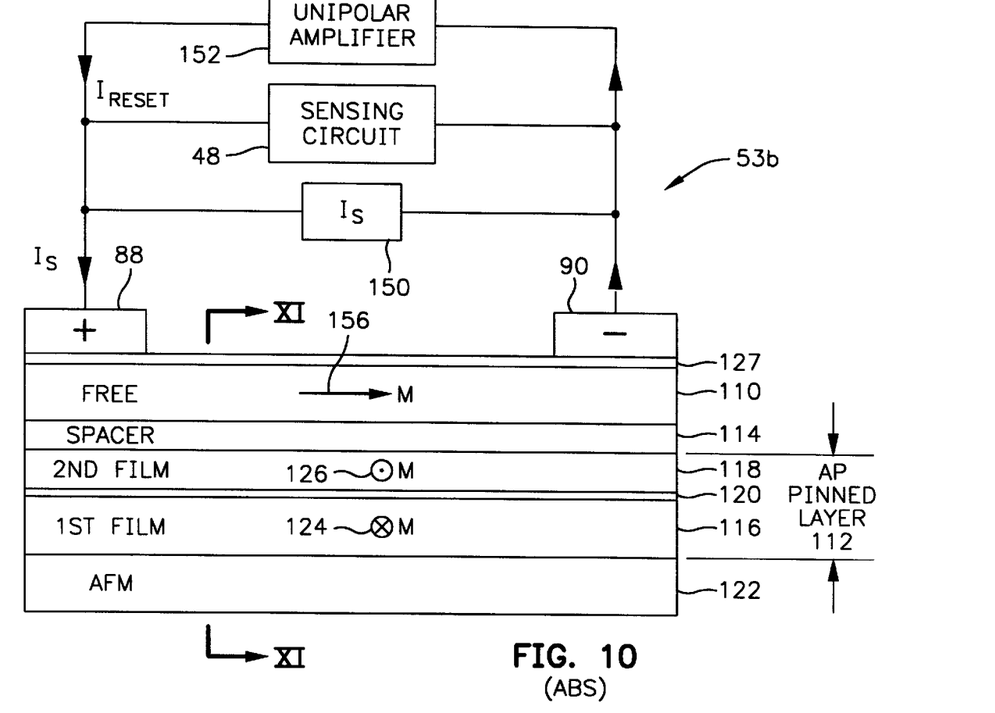
FIG. 10 is an enlarged schematic illustration of the antiparallel pinned spin valve 53 of FIG. 7 with the sense current $I_S$ directed in a second direction which causes symmetrical readback signals.
Figure 11:
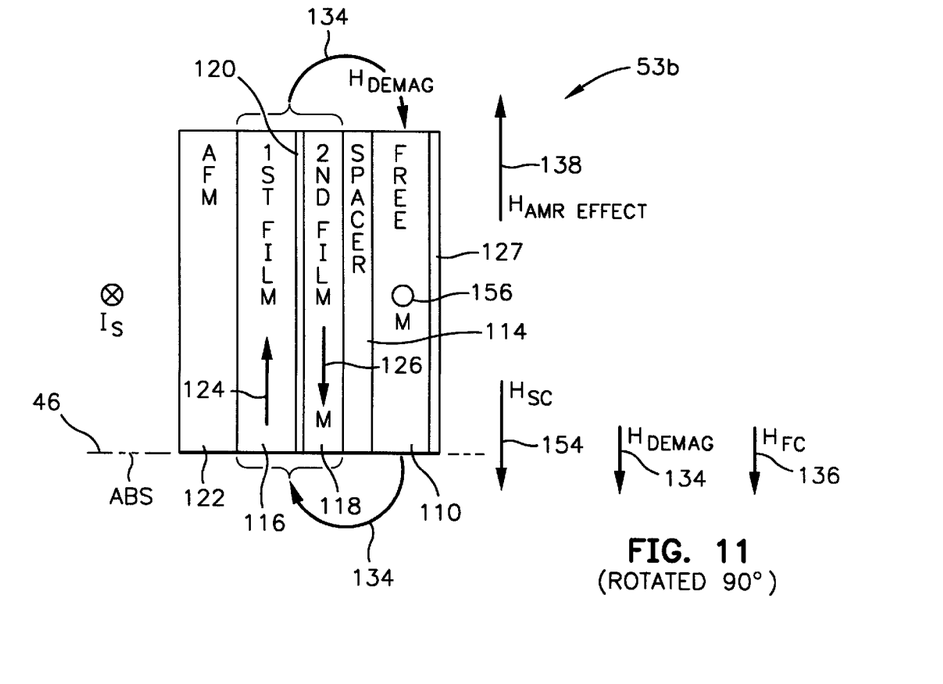
FIG. 11 is a view taken along plane II—II of FIG. 10 rotated 90 degrees clockwise.
Figures 12, 13:
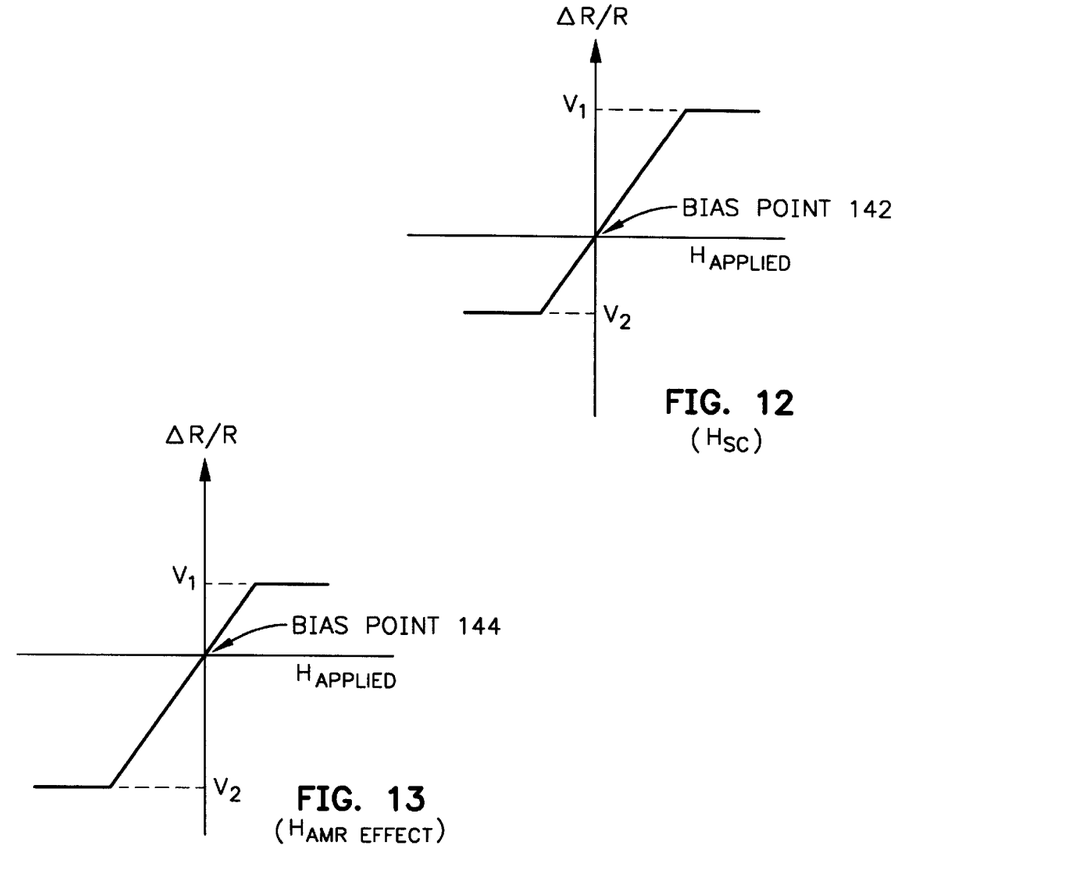
FIG. 12 is a transfer curve for an antiparallel pinned spin valve under the influence of only a sense current field on the free layer.
FIG. 13 is the transfer curve for an antiparallel pinned spin valve under the influence of only an AMR effect.
Figure 14:
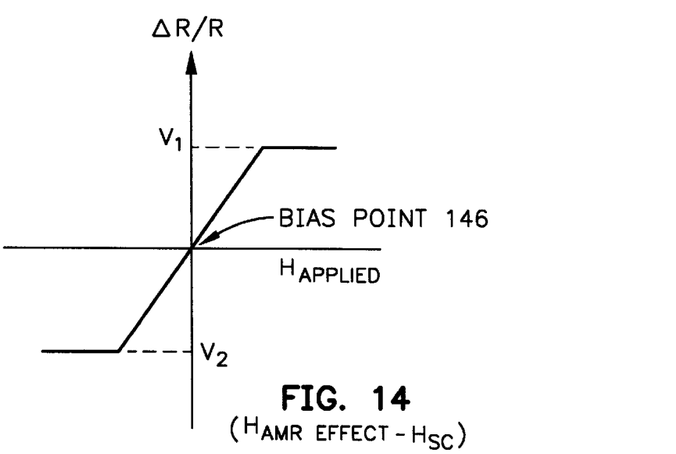
FIG. 14 is a the transfer curve for an antiparallel pinned spin valve where the influence of the sense current field counterbalances the influence of the AMR effect on the free layer so that positive and negative readback signals are symmetrical about a zero bias point.

As a result of my investigation I am showing two embodiments of an antiparallel (AP) pinned spin valve sensor 53, one of these embodiments of the sensor 53a being shown in FIGS. 8 and 9 and the other embodiment of the sensor 53b being shown in FIGS. 10 and 11. One of the differences between the embodiments 53a and 53b is that the sense currents $I_S$ are in opposite directions. In FIGS. 8 and 9 it will be shown how the direction of the sense current $I_S$ results in a less efficient AP pinned spin valve 53a and in FIGS. 10 and 11 will be shown how the direction of the sense current $I_S$ results in a highly efficient AP pinned spin valve sensor 53b. Accordingly, the AP pinned spin valve sensor 53b is the invention of the present application. FIGS. 12–14 explain why the appropriately directed sense current $I_S$ in FIGS. 10 and 11 results in an improved AP pinned spin valve sensor 53b.

The sensor 53a shown in FIGS. 8 and 9 has a ferromagnetic free layer 110, an antiparallel pinned ferromagnetic layer 112 and a nonmagnetic electrically conductive spacer layer 114. The spacer layer 114 is sandwiched between the free layer 110 and the pinned layer 112. The AP pinned layer 112 differs from the typical spin valve sensor, which employs a single pinned layer, in that the AP pinned layer 112 employs first and second ferromagnetic films 116 and 118 which are separated by a nonmagnetic electrically conductive spacer film 120. The first film 116 has a surface which interfaces with a surface of an antiferromagnetic layer 122 so that the antiferromagnetic layer pins the magnetic moment 124 of the first film in a pinned direction perpendicular to and away from the ABS. The moment of the first film 116 is pinned in this direction by exchange coupling with the antiferromagnetic layer 122. The spacer film 120 is very thin, in the order of 8 Å, which allows an antiferromagnetic exchange coupling between the first and second films 116 and 118. Accordingly, the magnetic moment 126 of the second film is directed in an opposite direction to the magnetic moment 124 of the first film 116, namely perpendicular to and toward the ABS. The thicker of the two films 116 and 118 determines the net magnetic moment of the AP pinned layer 112. The first film 116 has been selected to be the thicker of the two films so that the net magnetic moment is directed perpendicular to and away from the ABS. A capping layer 127 may cover the free layer 110.

The free layer 110 has a magnetic moment 128 which is free to rotate in first and second directions under the influence of field signals (flux incursions) from the rotating disk 34, these field signals being positive and negative going signals which are typically of equal magnitude. First and second leads 88 and 90 are electrically connected to the sensor 53a with a space therebetween which defines the active region of the sensor as well as the trackwidth of the read head employing the sensor. A sense current source 130 is electrically connected to the first and second leads 88 and 90 for providing a sense current $I_S$ which is conducted through the sensor as shown by the arrows in FIG. 8. In parallel with the sense current source 130 is a sensing circuit 132 for sensing potential changes across the sensor 53a when field signals are induced in the sensor by the rotating disk 34 shown in FIG. 1. The sense current source 130 and the sensing circuit 132 are part of the processing circuitry 48 in FIG. 3.

Each of the layers 110, 114, 116, 118 and 120 conduct a portion of the sense current between the first and second leads 88 and 90. A key parameter in the operation of a spin valve sensor is that the spacer layer 114 have a thickness which is less than the mean free path of conduction electrons flowing in the free and pinned layers 110 and 112. The degree of electron scattering, which depends upon the relative angle between the magnetization 128 of the free layer 110 and the net magnetization (difference between the magnetizations 124 and 126 and which is directed away from the ABS) of the AP pinned layer 112, determines the resistance of the sensor to the sense current $I_S$. The greatest scattering and the correspondingly greatest increase in resistance occurs when the magnetization 128 and the net magnetization of the AP pinned layer 112 are antiparallel and the least scattering and the correspondingly least resistance change occurs when the magnetization 128 and the net magnetization of the AP pinned layer 112 are parallel with respect to one another.

The magnetization 128 of the free layer 110 is typically oriented parallel to the ABS so that upon receiving positive and negative field signals from a rotating disk the magnetization 128 rotates upwardly or downwardly to decrease or increase the resistance of the sensor. This would be an opposite situation if the second film 118 was thicker than the first film 116 causing the net magnetization of the AP pinned layer 112 to be oriented toward the ABS instead away therefrom. My investigation shows that when the sense current is directed as shown in FIGS. 8 and 9 the transfer curve will be shifted relative to the bias point. This is caused by various influences on the free layer 110 which will be described next.

Various influences on the free layer and consequently various influences on the bias point of the transfer curve for the sensor 53a are shown in FIG. 9. The influences on the magnetic moment 128 of the free layer are $H_{demag}$ 134, $H_{FC}$ 136, the AMR EFFECT 138 and $H_{SC}$ 140. $H_{demag}$ 134 is due to the net moment of the AP pinned layer 112, $H_{FC}$ 136 is due to a ferromagnetic coupling between the free layer 110 and the second film 118, the AMR EFFECT 138 is due to an AMR effect which is proportional to the thickness of the free layer 110 and $H_{SC}$ 140 is the net sense current field on the free layer due to conduction of the sense current through the layers 114, 116, 118 and 120. $H_{demag}$ 134 is less than $H_{demag}$ of a single film layer employed in a typical spin valve because of the smaller net pinning moment of the AP pinned layer 112. The advantage of a small $H_{demag}$ in the AP pinned layer 112 is that exchange coupling between the antiferromagnetic layer 122 and the AP pinned layer 112 is increased to promote higher thermal stability of the AP pinned layer. The disadvantage is that $H_{demag}$ of the AP pinned layer does little to counterbalance the AMR EFFECT. In the embodiment shown in FIGS. 8 and 9 $H_{demag}$ and $H_{FC}$ are perpendicular to and toward the ABS while the AMR EFFECT and $H_{SC}$ are directed perpendicular to and away from the ABS. It can be seen that the $H_{SC}$ and the AMR EFFECT will not be balanced by $H_{demag}$ and $H_{FC}$. The direction of $H_{demag}$ and $H_{FC}$ can be reversed by orienting the spins of the antiferromagnetic layer 122 in an opposite direction, however, this would only exacerbate the problem.

It should be noted that the aforementioned influences are all magnetic field influences except for the AMR EFFECT. While the AMR EFFECT is not a magnetic field its influence is the same as a magnetic field from the standpoint of displacing the bias point of the transfer curve of the spin valve sensor. The AMR EFFECT changes the resistance of the free layer 110, shown in FIG. 11, in the same manner that it changes the resistance of an MR stripe in an AMR sensor. In an AMR sensor the resistance of an MR stripe is at a maximum when the direction of the magnetic moment of the MR stripe is parallel or antiparallel to the direction of a sense current through the MR stripe, and the resistance is at a minimum when the direction of the magnetic moment of the MR stripe is perpendicular to the direction of the sense current. Accordingly, the resistance of the spin valve sensor due to the GMR effect is altered by the resistance due to the AMR EFFECT. This results in a shifting of the transfer curve for the spin valve sensor. FIG. 11 can be employed for explaining how the transfer curve is shifted. Assuming that a positive magnetic incursion comes from a disk rotating below the ABS 46, the magnetic moment 156 in the free layer 110 will rotate upwardly which increases the resistance of the free layer due to the GMR effect. However, the upward rotation of the magnetic moment 156 causes the resistance of the free layer 110 to be reduced due to the AMR EFFECT. Accordingly, the resistance due to the GMR effect has been lessened by the resistance due to the AMR EFFECT resulting in a reduced positive signal. Now assuming that the magnetic disk rotating below the ABS induces a negative magnetic incursion on the spin valve the magnetic moment 156 of the free layer 110 rotates downwardly, decreasing the resistance of the free layer 110 due to the GMR effect and further decreasing the resistance of the layer 110 due to the AMR EFFECT. This results in a larger negative signal. Accordingly, the AMR EFFECT produces a reduced positive signal and a larger negative signal. This shifts the transfer curve of the spin valve sensor downwardly so that the transfer curve is asymmetrical about a bias point, which will be described next.

FIGS. 12, 13 and 14 are exemplary transfer curves for a spin valve sensor shown for the purpose of explaining the influence of sense current field $H_{SC}$ (FIG. 12), the AMR EFFECT (FIG. 13) and the combination of the AMR EFFECT and $H_{SC}$ (FIG. 14) on the bias point of the transfer curve. The transfer curve is a plot of $H_{applied}$ which is the positive and negative flux incursions from the rotating magnetic disk on the sensor versus the positive and negative readback signal voltages $V_1$ and $V_2$. If only the sense current field $H_{SC}$ is considered, as shown in FIG. 12, the positive and negative read signals $V_1$ and $V_2$ are asymmetrical with respect to a bias point 142 with the positive read signal $V_1$ being greater than the negative $V_2$. If only the AMR EFFECT is considered, as shown in FIG. 13, the read signals $V_1$ and $V_2$ are asymmetrical with respect to a bias point 144 with the negative read signal $V_2$ being greater than the positive read signal $V_1$. FIGS. 12 and 13 demonstrate that when the sense current $I_S$ is appropriately directed, as shown in FIG. 12, that the influence of the AMR EFFECT on the bias point can be counterbalanced as shown in FIG. 14. In FIG. 14 the sense current field $H_{SC}$ is subtracted from the AMR EFFECT to produce a zero influence on the bias point causing the positive and negative read signals $V_1$ and $V_2$ to be symmetrical with respect to the bias point 146 which is now at a zero point. This can be accomplished by appropriately directing the sense current $I_S$ with a predetermined magnitude. This same theory is applied to the invention of this application which is illustrated in FIGS. 10 and 11, which will be described next.

The AP pinned spin valve sensor 53b shown in FIGS. 10 and 11 is the same as the AP pinned spin valve sensor 53a shown in FIGS. 8 and 9, except a sense current source 150 is provided for directing the sense current in an opposite direction to that shown in FIG. 8 and a unipolar amplifier 152 is employed for purposes to be described hereinafter. When the sense current is directed, as shown by the arrows in FIG. 10, the sense current field $H_{SC}$ 154 is directed opposite to the AMR EFFECT 138 so that $H_{SC}$, $H_{demag}$ and $H_{FC}$ substantially counterbalance the AMR EFFECT and reduce the aforementioned asymmetry. This is accomplished by directing $I_S$ from the current source 150 in the appropriate direction and of a sufficient magnitude to implement the counterbalancing. In testing the AP pinned valve sensor 53a in FIGS. 8 and 9 the asymmetry was −40% where asymmetry is defined as $$\frac{V_1 - V_2}{\max(V_1 \text{ or } V_2)}.$$

In testing the AP pinned valve sensor 53b the asymmetry was +10%. It should be noted that when the sense current field $H_{SC}$ is employed to counterbalance the AMR EFFECT that the magnetic moment 156 of the free layer 110 may not be parallel to the ABS as indicated by the open circle in FIG. 11.

Another advantage of the spin valve sensor 53b is that the sense current through the free layer 110 will cause a sense current field which is imposed on and increases the magnetic strength of the pinning moment 124 of the first film 116. This will promote thermal stability of the sensor from the standpoint that high temperature incursions due to contact of the head with asperities on the rotating disk or electrostatic discharge from an object will not disorient the direction of the magnetic moment 124 until a higher temperature is reached. However, should this higher temperature be reached, which is referred to as the blocking temperature of the antiferromagnetic layer 122, I have provided the unipolar amplifier 152 for resetting the orientation of the antiferromagnetic layer 122 by conducting a resetting current through the antiferromagnetic layer 122. This current is of a higher magnitude than the sense current $I_S$ and typically would be three times $I_S$ for a very short period of time, such as 30 nanoseconds, to avoid overheating the antiferromagnetic layer 122. It should be noted that the direction of the reset current $I_{reset}$ is in the same direction as the sense current $I_S$.

Exemplary materials for the AP pinned layer spin valve sensors 53a and 53b are NiFe for the free layer 110, Cu for the spacer layer 114, NiFe for the first and second films 116 and 118, Ru for the spacer layer 120, and Ta for the capping layer 123.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A thin film magnetoresistive (MR) spin valve read sensor which has positive and negative read signals about a bias point of a transfer curve upon sensing positive and negative magnetic incursions from a moving magnetic medium comprising:

a ferromagnetic free layer having a magnetic moment which is free to rotate in first and second directions from a position which corresponds to said bias point upon sensing said positive and negative magnetic incursions respectively;

an antiparallel pinned layer;

an antiferromagnetic layer immediately adjacent said antiparallel pinned layer which pins a magnetic moment of the antiparallel pinned layer along a pinned direction;

an electrically conductive nonmagnetic spacer layer sandwiched between the free layer and the antiparallel pinned layer so that, upon sensing said positive and negative magnetic incursions, the magnetic moment of the free layer rotates in said first and second directions relative to said pinned direction of the magnetic moment of the pinned layer thus causing an increase or decrease in magnetoresistance respectively;

sense current source means connected to the sensor for applying a sense current to the sensor in a predetermined direction;

upon the application of said sense current the magnetic moment of the free layer being forced by an anisotropic magnetoresistive (AMR) effect of the free layer to rotate in said second direction; and said predetermined direction producing a field on the free layer that forces said magnetic moment to rotate in said first direction, whereby symmetry of the positive and negative read signals about said bias point is improved.

2. A sensor as claimed in claim 1 including:

a unipolar amplifier connected across the sensor for applying a reset current through the sensor in the same direction as the sense current for resetting pinning of the moment of the pinned layer.

3. A sensor as claimed in claim 2 wherein the reset current is at least three times greater than the sense current.

4. A sensor as claimed in claim 1 wherein the direction of the sense current through the free layer produces a field from the free layer which increases the pinning of the moment of the pinned layer.

5. A sensor as claimed in claim 1 wherein the sensor has an air bearing surface (ABS) and is in a quiescent state when no magnetic incursion is received from said magnetic medium, the sensor comprising:

the pinned direction being perpendicular to the ABS; and the magnetic moment of the free layer being directed parallel to the ABS when the sensor is in said quiescent state.

6. A sensor as claimed in claim 5 including:

a unipolar amplifier connected across the sensor for applying a reset current through the sensor in the same direction as the sense current for resetting pinning of the moment of the pinned layer.

7. A sensor as claimed in claim 6 wherein the reset current is at least three times greater than the sense current.

8. A sensor as claimed in claim 7 wherein the direction of the sense current through the free layer produces a field from the free layer which increases the pinning of the moment of the pinned layer.

9. A thin film magnetoresistive (MR) spin valve read sensor comprising:

a ferromagnetic free layer having a magnetic moment which is free to rotate in first and second directions from a neutral position upon sensing said positive and negative magnetic incursions respectively;

a pinned layer having a magnetic moment which is pinned in a pinned direction;

the pinned layer including:

first and second ferromagnetic thin films and a nonmagnetic electrically conductive spacer film; and the spacer film being sandwiched between the first and second films;

an antiferromagnetic layer immediately adjacent said first thin film which pins the magnetic moment of the first thin film along said pinned direction or antiparallel thereto;

a nonmagnetic electrically conductive spacer layer sandwiched between the free layer and the pinned layer so that upon sensing positive and negative magnetic incursions the magnetic moment of the free layer rotates in said first and second directions relative to the pinned direction of the magnetic moment of the pinned layer resulting in an increase or decrease in magnetoresistance respectively of the sensor to a sense current;

sense current source means connected to the sensor for applying said sense current;

the direction of the magnetic moment of the free layer being influenced by a ferromagnetic coupling field ($H_{FC}$) from said second film of the pinned layer, a demagnetization field ($H_{demag}$) from the pinned layer, an anisotropic magnetoresistance effect (AMR EFFECT) and, upon applying said sense current, a net sense current field ($H_{SC}$) due to fields from electrically conductive layers of the sensor other than the free layer; and said sense current source means for applying the sense current in a predetermined direction and of such a magnitude that a net influence of $H_{FC}$, $H_{demag}$, the AMR EFFECT, and $H_{SC}$ on the free layer is substantially zero.

10. A sensor as claimed in claim 9 including:

a unipolar amplifier connected across the sensor for applying a reset current through the sensor in the same direction as the sense current for resetting pinning of the moment of the pinned layer.

11. A sensor as claimed in claim 10 wherein the reset current is at least three times greater than the sense current.

12. A sensor as claimed in claim 9 wherein the direction of the fields $H_{FC}$, $H_{demag}$ and $H_{SC}$ being perpendicular to and toward an air bearing surface (ABS) and the direction of the influence of the AMR EFFECT being perpendicular to and away from the ABS.

13. A sensor as claimed in claim 9 wherein the AMR EFFECT has an influence on the free layer which is equivalent to a magnetic field which is antiparallel to the direction of the fields $H_{FC}$, $H_{demag}$ and $H_{SC}$.

14. A sensor as claimed in claim 9 wherein the first thin film is thicker than the second thin film so that the direction of the magnetic moment of the first thin film defines the pinned direction of the pinning moment of the pinned layer.

15. A sensor as claimed in claim 9 wherein the direction of the sense current through the free layer produces a field from the free layer which increases the pinning of the moment of the pinned layer.

16. A sensor as claimed in claim 9 wherein the sensor has an air bearing surface (ABS) and is in a quiescent state when no signal is received from a magnetic disk, the sensor comprising:

the pinned direction being perpendicular to the ABS; and the magnetic moment of the free layer being directed parallel to the ABS when the sensor is in said quiescent state.

17. A sensor as claimed in claim 16 wherein the direction of the sense current through the free layer produces a field from the free layer which increases the pinning of the moment of the pinned layer.

18. A sensor as claimed in claim 17 wherein the direction of the fields $H_{FC}$, $H_{demag}$ and $H_{SC}$ being perpendicular to and toward the ABS and the direction of the influence of the AMR EFFECT being perpendicular to and away from the ABS.

19. A sensor as claimed in claim 18 wherein the AMR EFFECT has an influence on the free layer which is equivalent to a magnetic field which is antiparallel to the direction of the fields $H_{FC}$, $H_{demag}$ and $H_{SC}$.

20. A sensor as claimed in claim 19 wherein the first thin film is thicker than the second thin film so that the direction of the magnetic moment of the first thin film defines the pinned direction of the pinning moment of the pinned layer.

21. A sensor as claimed in claim 20 including:

a unipolar amplifier connected across the sensor for applying a reset current through the sensor in the same direction as the sense current for resetting pinning of the moment of the pinned layer.

22. A sensor as claimed in claim 21 wherein the reset current is at least three times greater than the sense current.

23. A magnetic head comprising:

a write head including:

at least one coil layer and an insulation stack;

the coil layer being embedded in the insulation stack;

first and second pole pieces connected at a back gap and having pole tips with edges forming a portion of an air bearing surface (ABS);

the insulation stack being sandwiched between the first and second pole pieces; and a write gap layer sandwiched between the pole tips of the first and second pole pieces and forming a portion of the ABS;

a read head including:

a spin valve sensor, first and second gap layers and first and second shield layers; and the spin valve sensor being sandwiched between the first and second gap layers and the first and second gap layers being sandwiched between the first and second shield layers;

the spin valve sensor including:

a ferromagnetic free layer having a magnetic moment which is free to rotate in first and second directions from a position which corresponds to a zero bias point of a transfer curve upon sensing positive and negative magnetic incursions respectively from a magnetic medium;

an antiparallel pinned layer having a magnetic moment which is pinned in a pinned direction;

the antiparallel pinned layer including first and second ferromagnetic thin films and a nonmagnetic electrically conductive spacer film, the spacer film being sandwiched between the first and second films;

an antiferromagnetic layer immediately adjacent said first thin film which pins the magnetic moment of the antiparallel pinned layer in said pinned direction;

a nonmagnetic electrically conductive spacer layer sandwiched between the free layer and the pinned layer so that the magnetic moment of the free layer rotates in said first and second directions relative to the pinned direction of the magnetic moment of the pinned layer upon sensing said positive and negative magnetic incursions thus causing an increase or decrease in magnetoresistance respectively of the sensor; and sense current source means connected to the sensor for applying a sense current through the sensor in a predetermined direction and of a predetermined magnitude for improving read signal symmetry of the read sensor about said zero bias point.

24. A magnetic head as claimed in claim 23 including:

the antiferromagnetic layer being immediately adjacent said first thin film which pins the magnetic moment of the first thin film along said third direction or antiparallel thereto;

the direction of the magnetic moment of the free layer and thus the bias point being influenced by a ferromagnetic coupling field ($H_{FC}$) from said second film of the pinned layer, a demagnetization field ($H_{demag}$) from the pinned layer, an anisotropic magnetoresistance effect (AMR EFFECT) of the free layer and a net sense current field ($H_{SC}$) due to fields from electrically conductive layers of the sensor other than the free layer upon applying said sense current; and said sense current source means for applying the sense current in a direction so that a net influence of $H_{FC}$, $H_{demag}$, the AMR EFFECT, and $H_{SC}$ on the free layer is substantially zero.

25. A magnetic head as claimed in claim 24 including:

a unipolar amplifier connected across the sensor for applying a reset current through the sensor in the same direction as the sense current for resetting the pinning of the moment of the pinned layer.

26. A magnetic head as claimed in claim 25 wherein the reset current is at least three times greater than the sense current.

27. A magnetic head as claimed in claim 26 wherein the sensor has an air bearing surface (ABS) and is in a quiescent state when no signal is received from a magnetic disk, the magnetic head comprising:

the pinned direction being perpendicular to the ABS; and the magnetic moment of the free layer being directed parallel to the ABS when the sensor is in said quiescent state.

28. A magnetic head as claimed in claim 27 wherein the direction of the sense current through the free layer produces a field from the free layer which increases the pinning of the moment of the pinned layer.

29. A magnetic head as claimed in claim 28 wherein the direction of the fields $H_{FC}$, $H_{demag}$ and $H_S$ being perpendicular to and toward the ABS and the direction of the influence of the AMR EFFECT being perpendicular to and away from the ABS.

30. A magnetic head as claimed in claim 29 wherein the AMR effect has an influence on the free layer which is equivalent to a magnetic field which is antiparallel to the direction of the fields $H_{FC}$, $H_{demag}$ and $H_{SC}$.

31. A magnetic head as claimed in claim 30 wherein the first thin film is thicker than the second thin film so that the direction of the magnetic moment of the first thin film defines the pinned direction of the pinning moment of the pinned layer.

32. A magnetic head as claimed in claim 31 including:
  a unipolar amplifier connected across the sensor for applying a reset current through the sensor in the same direction as the sense current for resetting the pinning of the moment of the pinned layer.

33. A magnetic head as claimed in claim 32 wherein the reset current is at least three times greater than the sense current.

34. A magnetic disk drive comprising:
a write head including:
  at least one coil layer and an insulation stack;
  the coil layer being embedded in the insulation stack;
  first and second pole pieces connected at a back gap and having pole tips with edges forming a portion of an air bearing surface (ABS);
  the insulation stack being sandwiched between the first and second pole pieces; and
  a write gap layer sandwiched between the pole tips of the first and second pole pieces and forming a portion of the ABS;
a read head including:
  an antiparallel pinned spin valve sensor, first and second gap layers and first and second shield layers; and
  the antiparallel pinned spin valve sensor being sandwiched between the first and second gap layers and the first and second gap layers being sandwiched between the first and second shield layers:
the antiparallel pinned spin valve sensor including:
  a ferromagnetic free layer having a magnetic moment which is free to rotate in first and second directions from a position which corresponds to a zero bias point of a transfer curve upon sensing positive and negative magnetic incursions respectively from a magnetic disk;
  a pinned layer having a magnetic moment which is pinned in a pinned direction;
  the pinned layer including first and second ferromagnetic thin films and a nonmagnetic electrically conductive spacer film, the spacer film being sandwiched between the first and second films;
  an antiferromagnetic layer immediately adjacent said first thin film which pins the magnetic moment of the first thin film along said pinned direction or antiparallel thereto;
  a non-magnetic electrically conductive insulative spacer layer sandwiched between the free layer and the pinned layer so that upon sensing said positive and negative magnetic incursions the magnetic moment of the free layer rotates in said first and second directions relative to the pinned direction of the magnetic moment of the pinned layer resulting in an increase or decrease in magnetoresistance respectively of the sensor to a sense current;
  a sense current source means connected to the sensor for applying said sense current through the sensor;

the direction of the magnetic moment of the free layer and thus the bias point being influenced by a ferromagnetic coupling field ($H_{FC}$) from said second film of the pinned layer, a demagnetization field ($H_{demag}$) from the pinned layer, an anisotropic magnetoresistance effect (AMR EFFECT) and, upon applying said sense current, a net sense current field ($H_{SC}$) due to fields from electrically conductive layers of the sensor other than the free layer; and
  said sense current source means for applying the sense current in a predetermined direction and of such a magnitude so that a net influence of $H_{FC}$, $H_{demag}$, the AMR EFFECT, and $H_{SC}$ on the free layer is substantially zero;
  the write head and the read head being adjacent one another to form a combined magnetic head;
  a frame;
  a magnetic disk rotatably supported on the frame;
  a support mounted on the frame for supporting the head in a transducing relationship with the magnetic disk;
  means for rotating the magnetic disk;
  positioning means connected to the support for moving the combined magnetic head to multiple positions with respect to said magnetic disk; and
  means connected to the combined magnetic head, to the means for rotating the magnetic disk and to the positioning means for exchanging signals with the combined magnetic head, for controlling movement of the magnetic disk and for controlling the position of the combined magnetic head.

35. A magnetic disk drive as claimed in claim 34 including:
  a unipolar amplifier connected across the sensor for applying a reset current through the sensor in the same direction as the sense current for resetting pinning of the moment of the pinned layer.

36. A magnetic disk drive as claimed in claim 34 wherein the sensor has an air bearing surface (ABS) and is in a quiescent state when no signal is received from a magnetic disk, the disk drive comprising:
  the pinned direction being perpendicular to the ABS;
  the magnetic moment of the free layer being directed parallel to the ABS when the sensor is in said quiescent state; and
  the direction of the sense current through the free layer producing a field from the free layer which increases the pinning of the moment of the pinned layer.

37. A magnetic disk drive as claimed in claim 36 comprising:
  said AMR EFFECT having an influence on the free layer which is equivalent to a magnetic field which is antiparallel to the direction of the fields $H_{FC}$, $H_{demag}$ and $H_{SC}$; the direction of the fields $H_{FC}$, $H_{demag}$ and $H_{SC}$ being perpendicular to and toward the ABS and the direction of the influence of the AMR EFFECT being perpendicular to and away from the ABS; and
  the first thin film is thicker than the second thin film so that the direction of the magnetic moment of the first thin film defines the direction of the pinning moment of the pinned layer.

38. A magnetic disk drive as claimed in claim 37 including:
  a unipolar amplifier connected across the sensor for applying a reset current through the sensor for resetting pinning of the moment of the pinned layer.

39. A magnetic disk drive comprising:
a write head including:
  at least one coil layer and an insulation stack;
  the coil layer being embedded in the insulation stack;
  first and second pole pieces connected at a back gap and having pole tips with edges forming a portion of an air bearing surface (ABS);
  the insulation stack being sandwiched between the first and second pole pieces; and
  a write gap layer sandwiched between the pole tips of the first and second pole pieces and forming a portion of the ABS;
a read head including:
  a spin valve sensor, first and second gap layers and first and second shield layers; and
  the spin valve sensor being sandwiched between the first and second gap layers and the first and second gap layers being sandwiched between the first and second shield layers:
the spin valve sensor including:
  a ferromagnetic free layer having a magnetic moment which is free to rotate in first and second directions upon sensing positive and negative magnetic incursions respectively from a magnetic disk;
  an antiparallel pinned layer having a magnetic moment which is pinned in a third direction;
  the antiparallel pinned layer including first and second ferromagnetic thin films and a nonmagnetic electrically conductive spacer film, the spacer film being sandwiched between the first and second films;
  an antiferromagnetic layer immediately adjacent said first thin film which pins the magnetic moment of the antiparallel pinned layer;
  an electrically conductive nonmagnetic insulative spacer layer sandwiched between the free layer and the pinned layer so that the magnetic moment of the free layer rotates in said first and second directions relative to the magnetic moment of the pinned layer upon sensing said positive and negative magnetic incursions thus causing an increase or decrease in magnetoresistance of the sensor; and
  means connected to the sensor for applying a sense current to the sensor in a predetermined direction and of a predetermined magnitude so that the read sensor has improved read signal symmetry about a zero bias point;
the write head and the read head being adjacent one another to form a combined magnetic head;
a frame;
a magnetic disk rotatably supported on the frame;
a support mounted on the frame for supporting the head in a transducing relationship with the magnetic disk;
means for rotating the magnetic disk;
positioning means connected to the support for moving the combined magnetic head to multiple positions with respect to said magnetic disk; and
means connected to the combined magnetic head, to the means for rotating the magnetic disk and to the positioning means for exchanging signals with the combined magnetic head, for controlling movement of the magnetic disk and for controlling the position of the combined magnetic head.

40. A magnetic disk drive as claimed in claim 39 wherein the sensor has an air bearing surface (ABS) and is in a quiescent state when no signal is received from a magnetic disk, the disk drive comprising:

the pinned direction being perpendicular to the ABS; and
the magnetic moment of the free layer being directed parallel to the ABS when the sensor is in said quiescent state.

41. A magnetic disk drive as claimed in claim 40 including:
  a unipolar amplifier connected across the sensor for applying a reset current through the sensor in the same direction as the sense current for resetting pinning of the moment of the pinned layer.

42. A magnetic disk drive as claimed in claim 41 wherein the reset current is at least three times greater than the sense current.

43. A magnetic disk drive as claimed in claim 39 wherein the direction of the sense current through the free layer produces a field from the free layer which increases the pinning of the moment of the pinned layer.

44. A thin film magnetoresistive (MR) spin valve read sensor comprising:
  a ferromagnetic free layer having a magnetic moment which is free to rotate in first and second directions from a neutral position upon sensing said positive and negative magnetic incursions respectively;
  a pinned layer having a magnetic moment which is pinned in a pinned direction;
  the pinned layer including:
    first and second ferromagnetic thin films and a nonmagnetic electrically conductive spacer film; and
    the spacer film being sandwiched between the first and second films;
  an antiferromagnetic layer immediately adjacent said first thin film which pins the magnetic moment of the first thin film along said pinned direction or antiparallel thereto;
  a nonmagnetic electrically conductive spacer layer sandwiched between the free layer and the pinned layer so that upon sensing said positive and negative magnetic incursions the magnetic moment of the free layer rotates in said first and second directions relative to the pinned direction of the magnetic moment of the pinned layer resulting in an increase or decrease in magnetoresistance respectively of the sensor to a sense current;
  a sense current source means connected to the sensor for applying said sense current through the sensor;
  upon application of said sense current, an anisotropic magnetoresistance effect (AMR EFFECT) of the free layer forcing the magnetic moment of the free layer to rotate in said first direction; and
  said sense current source means for applying the sense current in a predetermined direction through the sensor to force the magnetic moment of the free layer to rotate in said second direction.

45. A sensor as claimed in claim 44 wherein said sense current is applied by said sense current source means.

46. A sensor as claimed in claim 44 including:
  a unipolar amplifier connected across the sensor for applying a reset current through the sensor in the same direction as the sense current for resetting pinning of the moment of the pinned layer.

47. A sensor as claimed in claim 46 wherein the reset current is at least three times greater than the sense current.

48. A sensor as claimed in claim 44 wherein the direction of the sense current through the free layer produces a field from the free layer which increases the pinning of the moment of the pinned layer.

49. A magnetic head comprising:

a write head including:
- at least one coil layer and an insulation stack;
- the coil layer being embedded in the insulation stack;
- first and second pole pieces connected at a back gap and having pole tips with edges forming a portion of an air bearing surface (ABS);
- the insulation stack being sandwiched between the first and second pole pieces; and
- a write gap layer sandwiched between the pole tips of the first and second pole pieces and forming a portion of the ABS;

a read head including:
- a spin valve sensor, first and second gap layers and first and second shield layers; and
- the spin valve sensor being sandwiched between the first and second gap layers and the first and second gap layers being sandwiched between the first and second shield layers:

the spin valve sensor including:
- a ferromagnetic free layer having a magnetic moment which is free to rotate in first and second directions from a position which corresponds to a zero bias point of a transfer curve upon sensing positive and negative magnetic incursions respectively from a magnetic medium;
- an antiparallel pinned layer having a magnetic moment which is pinned in a pinned direction;
- the antiparallel pinned layer including first and second ferromagnetic thin films and a nonmagnetic electrically conductive spacer film, the spacer film being sandwiched between the first and second films;
- an antiferromagnetic layer immediately adjacent said first thin film which pins the magnetic moment of the antiparallel pinned layer in said pinned direction;
- a nonmagnetic electrically conductive spacer layer sandwiched between the free layer and the pinned layer so that the magnetic moment of the free layer rotates in said first and second directions relative to the pinned direction of the magnetic moment of the pinned layer upon sensing said positive and negative magnetic incursions thus causing an increase or decrease in magnetoresistance respectively of the sensor to a sense current; and
- sense current source means connected to the sensor for applying said sense current through the sensor;

the antiferromagnetic layer being immediately adjacent said first thin film which pins the magnetic moment of the first thin film along said third direction or antiparallel thereto;

upon the application of the sense current, an anisotropic magnetoresistance effect (AMR EFFECT) of the free layer forcing the magnetic moment of the free layer to rotate in said first direction; and said sense current source means for applying the sense current in a direction through the sensor to force the magnetic moment of the free layer to rotate in said second direction.

50. A magnetic head as claimed in claim 49 wherein said sense current is applied by said sense current source means.

51. A magnetic head as claimed in claim 49 including:
- a unipolar amplifier connected across the sensor for applying a reset current through the sensor in the same direction as the sense current for resetting the pinning of the moment of the pinned layer.

52. A magnetic head as claimed in claim 51 wherein the reset current is at least three times greater than the sense current.

53. A magnetic head as claimed in claim 52 wherein the sensor has an air bearing surface (ABS) and is in a quiescent state when no signal is received from a magnetic disk, the magnetic head comprising:
- the pinned direction being perpendicular to the ABS; and
- the magnetic moment of the free layer being directed parallel to the ABS when the sensor is in said quiescent state.

54. A magnetic head as claimed in claim 53 wherein the direction of the sense current through the free layer produces a field from the free layer which increases the pinning of the moment of the pinned layer.

* * * * *